United States Patent
Cheng

(10) Patent No.: US 9,465,487 B2
(45) Date of Patent: Oct. 11, 2016

(54) OPTICAL TOUCH SENSITIVE APPARATUS AND IMAGE CAPTURING APPARATUS

(71) Applicant: PixArt Imaging Inc., Hsinchu (TW)

(72) Inventor: Hsin-Chi Cheng, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 268 days.

(21) Appl. No.: 13/895,353

(22) Filed: May 15, 2013

(65) Prior Publication Data

US 2014/0091200 A1    Apr. 3, 2014

(30) Foreign Application Priority Data

Oct. 1, 2012    (TW) .............................. 101136263 A

(51) Int. Cl.
*G01D 5/353*    (2006.01)
*B82Y 15/00*    (2011.01)
*G06F 3/042*    (2006.01)

(52) U.S. Cl.
CPC .................................. *G06F 3/0423* (2013.01)

(58) Field of Classification Search
CPC ............. G06F 3/03547; G06F 3/0325; G06F 3/0317; G06F 3/0488; G06F 3/04883; G06F 3/04886; G06F 3/0421; G06F 3/0412; G06F 3/042; G06F 3/037; G06F 3/046; G06F 3/041; G06F 3/0423; H04N 1/02815; H04N 1/02865; H04N 1/1135; G01C 15/006; G02B 26/0833; G02B 26/105; G02B 6/0028; G02B 6/0031; G02B 6/0036; G02B 6/005; G02B 6/0055; G02B 6/35; G02B 6/351; G02B 6/03512; G02B 6/3516; G02B 26/0216; G02B 26/10; G02B 27/0031; G01J 1/04

USPC ......... 250/221, 549, 222.1, 578.1, 234, 235, 250/236, 206.1, 206.2; 345/173, 175, 176; 341/5; 178/18.09, 18.11; 340/518, 540, 340/541, 545.1, 546, 545.2, 545.3, 550, 340/552, 555–557, 568.1, 602

See application file for complete search history.

(56) References Cited

U.S. PATENT DOCUMENTS 4,107,522 A     8/1978   Walter
4,239,961 A *  12/1980   Lasar ............................ 250/221
4,294,543 A    10/1981   Apple et al.
(Continued)

FOREIGN PATENT DOCUMENTS

CN     101369202 B    1/2012
JP     2007-522652 A  8/2007
(Continued)

*Primary Examiner* — Pascal M Bui Pho
(74) *Attorney, Agent, or Firm* — Cheng-Ju Chiang

(57) ABSTRACT

An optical touch sensitive apparatus includes a substrate, a plurality of image capturing lens modules, a light detecting unit, and an optical path switching unit. The substrate has an operation surface. Each of the image capturing lens modules has a light input end and a light output end. The light input end is located at the edge of the substrate for capturing optical information in an objective space above the operation surface. The light output end is for outputting the optical information. The optical path switching unit is located among the light output ends and the light detecting unit for transmitting the optical information outputted from at least one of the light output ends to the light detecting unit. In addition, an image capturing apparatus is provided.

20 Claims, 8 Drawing Sheets

(56) References Cited

U.S. PATENT DOCUMENTS

| | | | |
|---|---|---|---|
| 4,553,842 A | 11/1985 | Griffin | |
| 4,811,004 A * | 3/1989 | Person et al. | 345/175 |
| 4,820,050 A | 4/1989 | Griffin | |
| 4,980,547 A * | 12/1990 | Griffin | G06F 3/0423 250/221 |
| 8,130,210 B2 * | 3/2012 | Saxena | G06F 3/0421 345/156 |
| 2004/0212603 A1* | 10/2004 | Cok | G06F 3/0412 345/175 |
| 2005/0156100 A1 | 7/2005 | Xie et al. | |
| 2010/0328243 A1* | 12/2010 | Wang | G06F 3/0423 345/173 |
| 2011/0001727 A1* | 1/2011 | Ko et al. | 345/175 |
| 2012/0176340 A1 | 7/2012 | Yang et al. | |
| 2012/0218228 A1* | 8/2012 | Payne | 345/175 |
| 2014/0340362 A1* | 11/2014 | Spears | 345/175 |

FOREIGN PATENT DOCUMENTS

| | | |
|---|---|---|
| TW | M420769 U1 | 1/2012 |
| TW | 201214244 A1 | 4/2012 |

* cited by examiner

OPTICAL TOUCH SENSITIVE APPARATUS AND IMAGE CAPTURING APPARATUS

FIELD OF THE INVENTION

The invention relates to a touch sensitive apparatus and an image capturing apparatus, and more particularly to an optical touch sensitive apparatus and an image capturing apparatus having a plurality of image capturing lens modules.

BACKGROUND OF THE INVENTION

Touch sensitive function has become an important function of modern electronic devices. Commonly used touch sensitive modules which provide the touch sensitive function include resistive touch screens, capacitive touch screens, and optical touch screens. They have been adopted in a variety of electronic devices in different practical applications.

An optical touch sensitive module detects touched positions on the touch screen by way of optical detectors. No extra pressure needs to be applied onto the screen, but only touching or even approaching close to the screen is enough for the optical detectors to conduct detection. The optical touch sensitive module usually has a plurality of infrared light sources and light detecting units arranged around the module. The infrared light sources are used for emitting infrared light toward an objective space above the screen surface. Once an object is present in the objective space and blocks the infrared light, the resulting optical information can be captured by the light detecting units from different view angles, and then analyzed for obtaining positions and moving traces of the object in the objective space.

However, the cost of the light detecting unit is high, so the total cost of the optical touch sensitive module is high as well. Therefore, how to solve the problem of the high cost and to popularize the optical touch sensitive module is a major subject in this field.

SUMMARY OF THE INVENTION

The invention provides an optical touch sensitive apparatus, which is capable of solving the above mentioned problem of high cost of the light detecting unit.

The invention provides an optical touch sensitive apparatus, including a substrate, a plurality of image capturing lens modules, a light detecting unit, and an optical path switching unit. The substrate has an operation surface. Each of the image capturing lens modules has a light input end and a light output end. The light input end is disposed on an edge of the substrate for obtaining optical information in an objective space above the operation surface. The light output end is configured for outputting the optical information. The optical path switching unit is disposed between the light output ends and the light detecting unit for transmitting the optical information output from at least one of the light output ends to the light detecting unit.

According to an embodiment of the invention, the optical path switching unit transmits the optical information output from the light output ends to the light detecting unit in turn.

According to an embodiment of the invention, the above mentioned substrate is a display panel.

According to an embodiment of the invention, the above mentioned substrate is of a rectangular shape.

According to an embodiment of the invention, the above mentioned optical touch sensitive apparatus includes two image capturing lens modules and both the light input ends of the image capturing lens modules are respectively disposed at two corners of the substrate.

According to an embodiment of the invention, the optical touch sensitive apparatus includes at least two above mentioned image capturing lens modules is at least two, and all the light input ends of the image capturing lens modules are respectively disposed at different corners of the substrate.

According to an embodiment of the invention, the above mentioned substrate further has a back surface opposite to the operation surface, and the light detecting unit and the optical path switching unit are disposed at the back surface.

According to an embodiment of the invention, the above mentioned optical path switching unit includes a reflective mirror and a swing mechanism connected to the reflective mirror, and the reflective mirror is swingable by the swing mechanism for reflecting the optical information output from at least one of the light output ends to the light detecting unit.

According to an embodiment of the invention, the above mentioned optical path switching unit includes a reflective mirror and a swing mechanism connected to the reflective mirror, and configured to selectively swing the reflective mirror between a first position and a second position so that when the reflective mirror is in the first position the optical information output from one of the light output ends is directly transmitted to the light detecting unit and not reflected by the reflective mirror, and when the reflective mirror is in the second position the optical information output from another one of the light output ends is reflected to the light detecting unit by the reflective mirror.

According to an embodiment of the invention, the above mentioned optical path switching unit includes a reflective mirror and a rotating mechanism connected to the reflective mirror, and the reflective mirror is rotatable by the rotating mechanism for reflecting the optical information output from at least one of the light output ends to the light detecting unit.

According to an embodiment of the invention, the above mentioned optical path switching unit includes a plurality of micro mirror devices respectively disposed at positions corresponding to the light output ends for reflecting the optical information output from at least one of the light output ends to the light detecting unit.

According to an embodiment of the invention, the above mentioned image capturing lens module includes a plurality of lenses and at least one reflective mirror.

According to an embodiment of the invention, the above mentioned optical touch sensitive apparatus further includes a light source unit disposed at an edge of the operation surface for providing light for the light input ends to realize the optical information.

According to an embodiment of the invention, the above mentioned light source unit includes a plurality of light guiding elements and a plurality of light emitting elements for providing light to the light guiding elements, such that the optical information is transmitted from the light guiding elements to the objective space above the operation surface.

According to an embodiment of the invention, the above mentioned light source unit includes a plurality of reflective elements and a plurality of light emitting elements for providing light to the reflective elements, such that the optical information is reflected from the reflective elements to the objective space above the operation surface.

The invention further provides an image capturing apparatus, which is capable of solving the above mentioned problem of high cost of the light detecting unit.

The invention provides an image capturing apparatus, including a plurality of image capturing lens modules, a light detecting unit, and an optical path switching unit. Each of the image capturing lens modules has a light input end and a light output end. Any two of the light input ends of the image capturing lens modules have different fields of view which are not overlapped with each other. The light input ends receive optical information from an objective space. The light output ends are configured for outputting the optical information. The optical path switching unit is disposed between the light output ends and the light detecting unit for transmitting the optical information output from the light output ends to the light detecting unit in turn, and generating corresponding images by the light detecting unit.

According to an embodiment of the invention, the above mentioned image capturing apparatus for used in a range finding system has two image capturing lens modules disposed at different locations and configured for receiving optical information provided by an object, the light detecting unit is configured for capturing the optical information received by the two image capturing lens modules and generating corresponding images, and thereby a value representing a distance of the object is calculated by the range finding system according to the images.

According to an embodiment of the invention, the above mentioned optical path switching unit includes a reflective mirror and a swing mechanism connected to the reflective mirror, and the reflective mirror selectively swings with the swing mechanism for reflecting the optical information output from the light output ends to the light detecting unit in turn.

According to an embodiment of the invention, the above mentioned optical path switching unit includes a reflective mirror, a swing mechanism connected to the reflective mirror, and configured to selectively swing the reflective mirror between a first position and a second position so that when the reflective mirror is in the first position the optical information output from one of the light output ends is directly transmitted to the light detecting unit and not reflected by the reflective mirror, and when the reflective mirror is in the second position the optical information output from the other one of the light output ends is reflected to the light detecting unit by the reflective mirror.

According to an embodiment of the invention, the above mentioned optical path switching unit includes a reflective mirror and a rotating mechanism connected to the reflective mirror, and the reflective mirror is rotatable by the rotating mechanism for reflecting the optical information output from the light output ends to the light detecting unit in turn.

According to an embodiment of the invention, the above mentioned optical path switching unit includes a plurality of micro mirror devices respectively disposed at positions corresponding to the light output ends for reflecting the optical information output from the light output ends to the light detecting unit in turn.

According to an embodiment of the invention, the above mentioned image capturing lens module includes a plurality of lenses and at least one reflective mirror.

The optical touch sensitive apparatus and the image capturing apparatus of the invention use only one light detecting unit. In comparison, the conventional optical touch sensitive apparatuses have to use more than one light detecting unit. Therefore, the apparatuses of the invention have the advantage of lower cost. Through the optical path switching unit, the optical information obtained by the image capturing lens modules is alternatively transmitted to the light detecting unit. In particular, the number of the image capturing lens modules of the optical path switching unit which has the rotating mechanism can be varied according to practical requirement.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
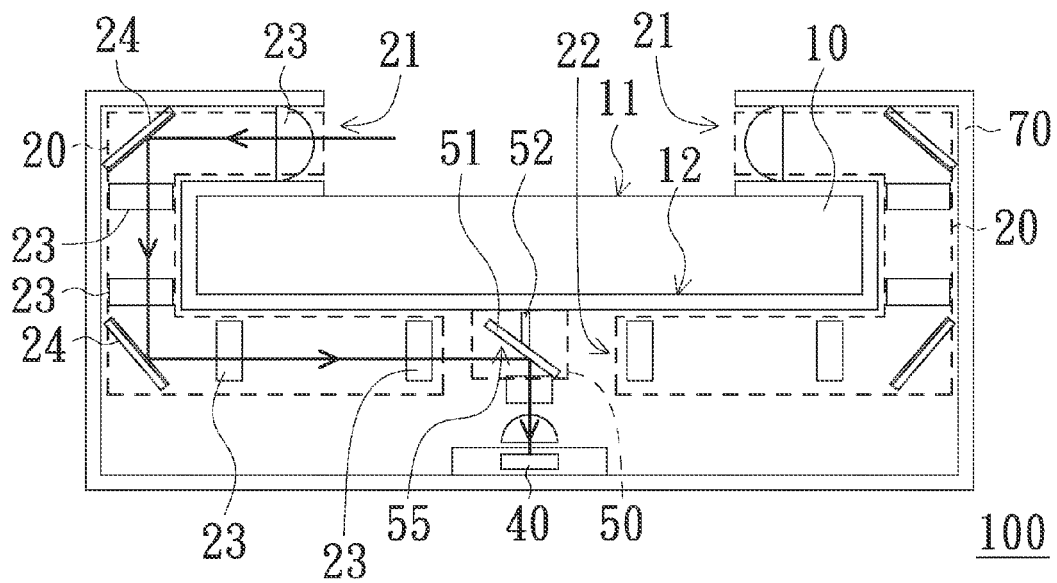
FIG. 1 is a schematic cross-sectional view of an optical touch sensitive apparatus according to an embodiment of the invention, which is in a first operational state.

FIG. 1 is a cross-sectional view of an optical touch sensitive apparatus according to an embodiment of the invention. The optical touch sensitive apparatus 100 mainly includes a substrate 10, a plurality of image capturing lens modules (the area circled by the dashed line as shown in FIG. 1) 20, a light detecting unit 40 and an optical path switching unit 50.

As shown in FIG. 1, the substrate 10 has an operation surface 11 for objects (such as fingers or pens) to touch or slide, and a back surface 12 opposite to the operation surface 11. In this embodiment, the substrate 10 may be various kinds of display panels, e.g. liquid crystal panels, but the invention is not limited thereto. Alternatively, the substrate 10 may be, for example, a glass substrate or a plastic substrate.

Figure 2:
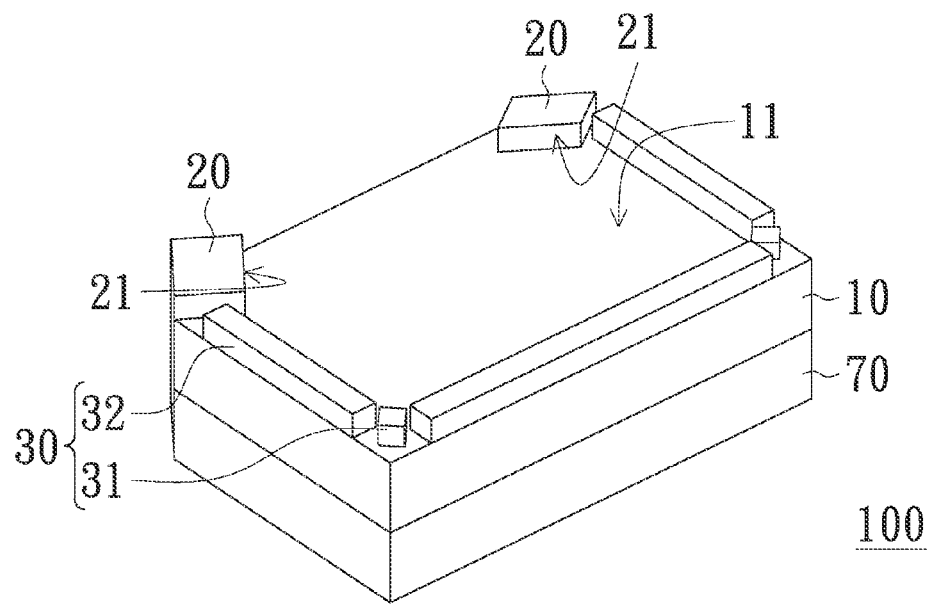
FIG. 2 is a schematic perspective view exemplifying the optical touch sensitive apparatus of FIG. 1.

Each of the image capturing lens modules 20 has a light input end 21 and a light output end 22. The light input ends 21 are respectively disposed at different edges of the substrate 10 and configured for obtaining optical information in an objective space above the operation surface 11. Any two light input ends 21 of the image capturing lens modules 20 have different fields of view, which are not completely overlapped with each other. The light output ends 22 are disposed at the back surface 12 of the substrate 10 and configured for outputting the optical information received by the light input ends 21. More specifically, each of the image capturing lens modules 20 has a plurality of lenses 23 and at least one reflective mirror 24, or other kinds of optical devices, used for transmitting the optical information received from the light input ends 21 to the light output ends 22. The number of the reflective mirrors 24 is, for example, two in this embodiment. They are respectively disposed between the lenses 23, but the invention is not limited thereto. FIG. 2 schematically illustrates an example of the optical touch sensitive apparatus 100. In this embodiment, the number of the image capturing lens modules 20 is two, and the light input ends 21 of the image capturing lens modules 20 are respectively disposed at two corners of the substrate 10. The optical touch sensitive apparatus 100, for example, further includes a light source unit 30 disposed at an edge of the operation surface 11 of the substrate 10 for emitting light to the image capturing lens modules 20. In this embodiment, the light source unit 30 includes a plurality of light emitting elements 31 and a plurality of light guiding elements 32 disposed on the edge of the operation surface 11. The light emitting elements 31 are used for providing light for the light guiding elements 32, such that the light guiding elements 32 can transmit the light required for realizing the optical information to a zone above the operation surface 11. The light emitting elements 31 are, for example, infrared light emitting elements. The light detecting unit 40 is, for example, used for detecting infrared light, but the invention is not limited thereto.

As shown in FIG. 1, the light detecting unit 40 and the optical path switching unit 50 are disposed substantially at the center of the back surface 12 of the substrate 10. The light detecting unit 40 is used for receiving optical information and transforming the optical information into electronic signals. The optical path switching unit 50 is disposed among the two light output ends 22 and the light detecting unit 40 for alternately transmitting the optical information output from the light output ends 22 to the light detecting unit 40. In this embodiment, the optical path switching unit 50 includes a reflective mirror 51 and a swing mechanism 52 connected to the reflective mirror 51. The reflective mirror 51 selectively swings with the swing mechanism 52 as one of two preset configurations so as to alternately reflect the optical information output from the light output ends 22 to the light detecting unit 40.

Besides, the optical touch sensitive apparatus 100, for example, further includes a shell 70. The shell 70 is used for containing the image capturing lens modules 20, the light detecting unit 40 and the optical path switching unit 50 in order to prevent the interference of external light with the light detecting unit 40, the image capturing lens modules 20 and the optical path switching unit 50 and assure of the accuracy of the optical information.

Figure 3:
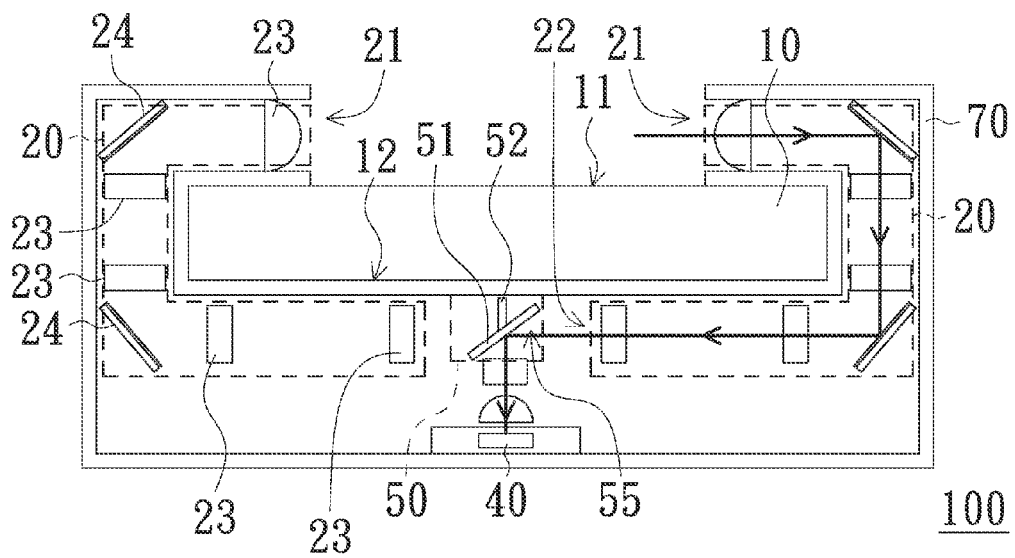
FIG. 3 is a schematic cross-sectional view of the optical touch sensitive apparatus of FIG. 1, which is in a second operational state.

A practical operation will be described herein with reference to FIG. 1. When the swing mechanism 52 swings the reflective surface 55 of the reflective mirror 51 toward the image capturing lens module 20 at the left side (in a first state), the reflective mirror 51 reflects the optical information output from the light output end 22 of the image capturing lens module 20 at the left side to the light detecting unit 40. As shown in FIG. 3, when the swing mechanism 52 swings the reflective surface 55 of the reflective mirror 51 toward the image capturing lens module 20 at the right side (in a second state), the reflective mirror 51 reflects the optical information output from the light output end 22 of the image capturing lens module 20 at the right side to the light detecting unit 40.

In this embodiment, since the optical path switching unit 50 alternately transmits the optical information of the two image capturing lens modules 20 to the light detecting unit 40, it is not necessary to use a corresponding number of light detecting units as in the prior art, and thus the cost for installing light detecting units can be saved.

Figure 4:
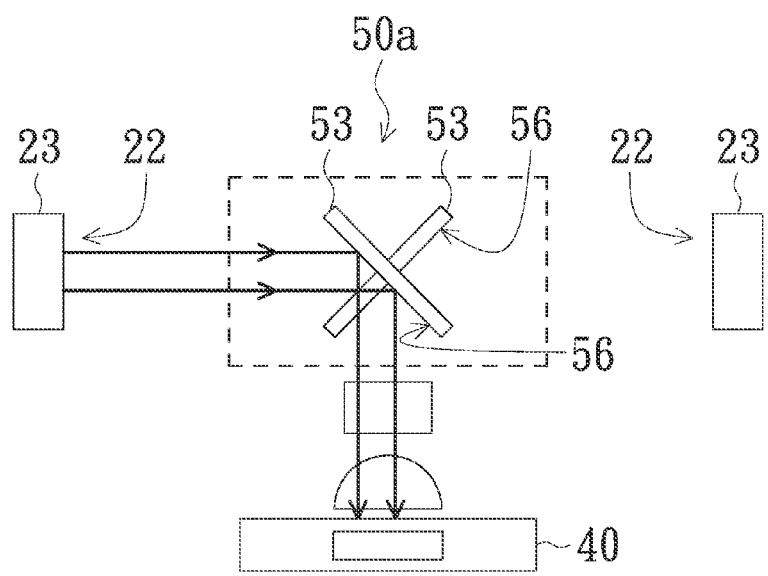
FIG. 4 is a schematic view of an exemplified optical path switching unit used in the optical touch sensitive apparatus of FIG. 1.

It should be noted that the switching of the optical paths for alternately reflecting the optical information output from the light output end 22 to the light detecting unit 40 may be achieved with an equivalent structure instead of the above-mentioned switching unit 50. The structure of the optical path switching unit adapted to be used in the invention is not limited to the disclosed. In another embodiment, as FIG. 4 shows, the optical path switching unit 50a includes two micro mirror devices 53 respectively disposed at positions corresponding to the two light output ends 22. The two micro mirror devices 53 are alternately used for reflecting the optical information output from respectively corresponding light output ends 22 to the light detecting unit 40. The two micro mirror devices 53 are arranged cross to each other. Each of the micro mirror devices 53 has an active surface 56 including a plurality of micro mirrors (not shown), which can be driven to change their swing angles. As can be seen in FIG. 4, when the left side light output end 22 outputs optical information, each of the micro mirrors of the active surface 56 facing toward the left side swings to positions parallel to the active surface 56. The active surface 56 is then used as a reflective surface for reflecting the optical information to the light detecting unit 40. At the same time, each of the micro mirrors of the other active surface 56 facing toward the right side swings to positions parallel to the path of optical information. The optical information can pass through the active surface 56.

Similarly, when the light output end 22 at the right side outputs optical information, each of the micro mirrors of the active surface 56 facing toward the right side swings to positions parallel to the active surface 56. The active surface 56 is used as a reflective surface for reflecting the optical information to the light detecting unit 40. At the same time, each of the micro mirrors of the other active surface 56 facing toward the left side swings to positions parallel to the path of optical information. The optical information can pass through the active surface 56.

Figure 5:
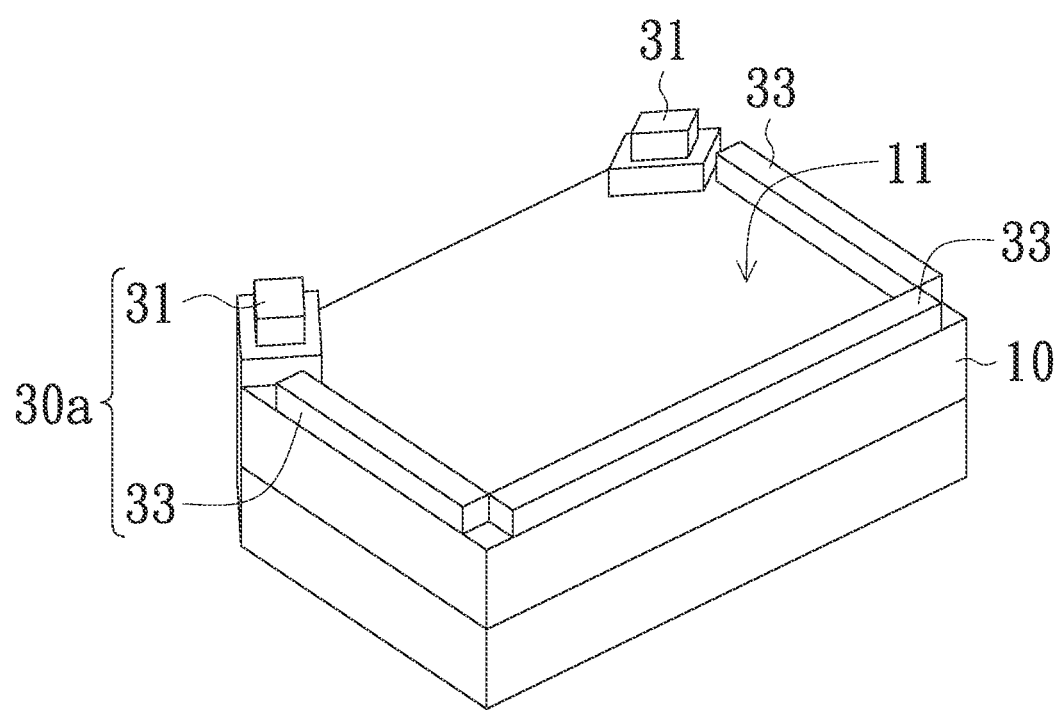
FIG. 5 is a schematic perspective view further exemplifying the optical touch sensitive apparatus of FIG. 1.

Besides, the light source unit 30 may be implemented with another structure to achieve the purpose of providing optical information to a zone above the operation surface 11. As FIG. 5 shows, the light source unit 30a includes a plurality of light emitting elements 31 and a plurality of reflective elements 33. The light emitting elements 31 are used for providing light to the reflective elements 33 which further reflect the optical information to a zone above the operation surface 11.

Figure 6:
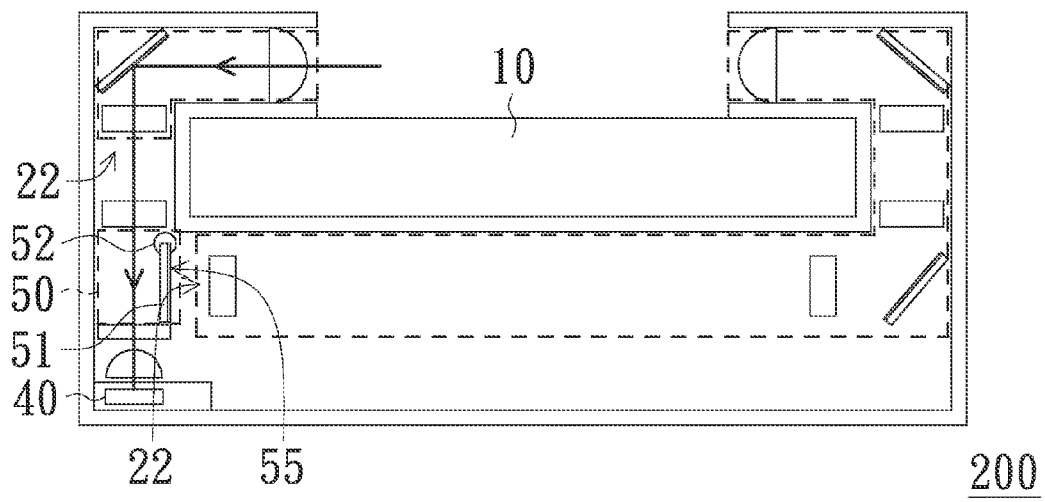
FIG. 6 is a schematic cross-sectional view of an optical touch sensitive apparatus according to another embodiment of the invention, which is in a first operational state.
Figure 7:
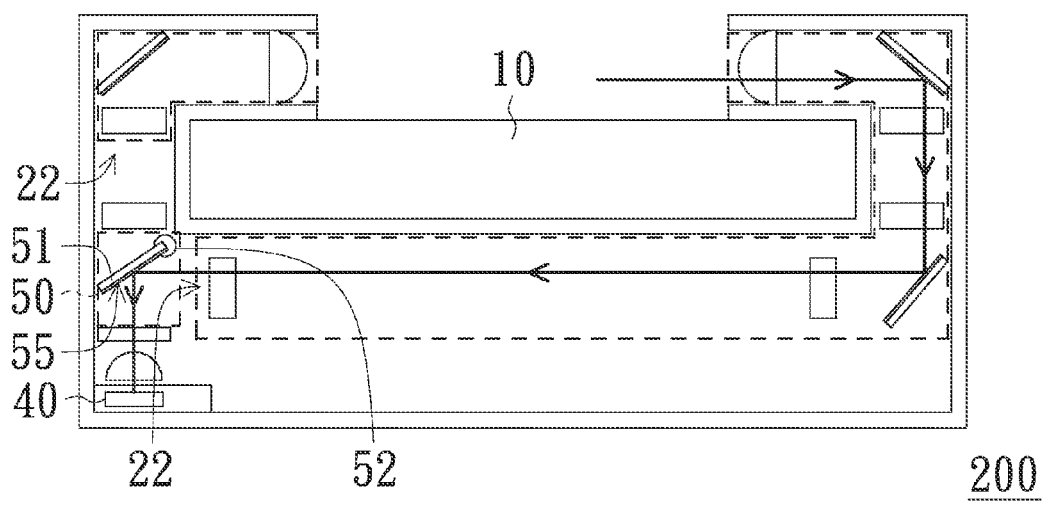
FIG. 7 is a schematic cross-sectional view of the optical touch sensitive apparatus of FIG. 6, which is in a second operational state.

FIG. 6 schematically illustrates an optical touch sensitive apparatus 200 according to another embodiment of the invention. The structure and advantages of the optical touch sensitive apparatus 200 of this embodiment is similar to the optical touch sensitive apparatus 100 in FIG. 1 except that the light detecting unit 40 and the optical path switching unit 50 are both located at an edge of the back surface 12 of the substrate 10. The reflective mirror 51 is swingable by a swing mechanism 52 between a first position (a first operational state) and a second position (a second operational state). When the reflective mirror 51 is in the first operational state as shown in FIG. 6, the optical information output from the left one of the light output ends 22 is directly transmitted to the light detecting unit 40 without being reflected by the reflective mirror 51. When the reflective mirror 51 is in the second operational state as shown in FIG. 7, the optical information output from the right one of the light output ends 22 is reflected to the light detecting unit 40 by the reflective mirror 51.

Figure 8:
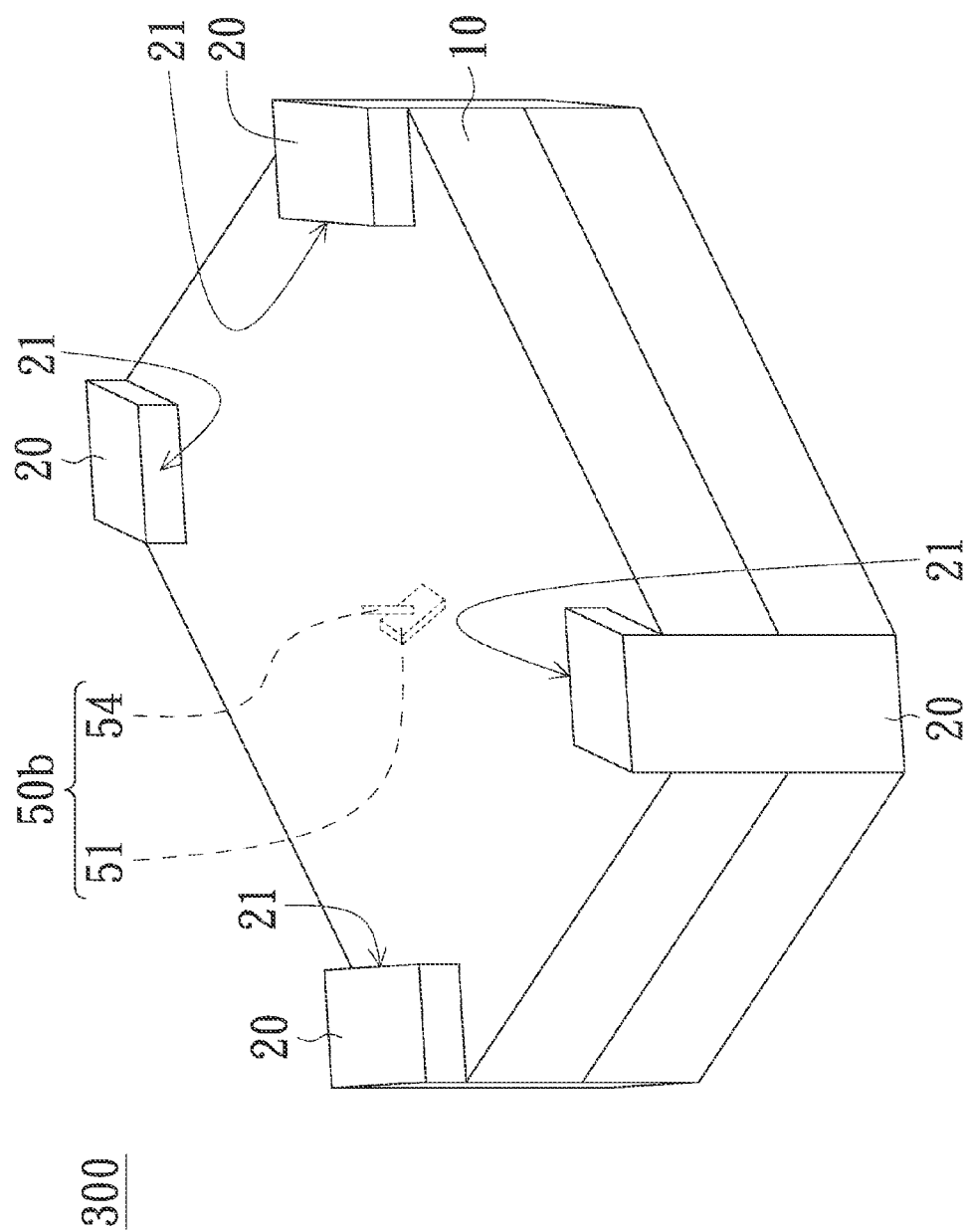
FIG. 8 is a schematic perspective view of an optical touch sensitive apparatus according to a further embodiment of the invention.
Figure 9:
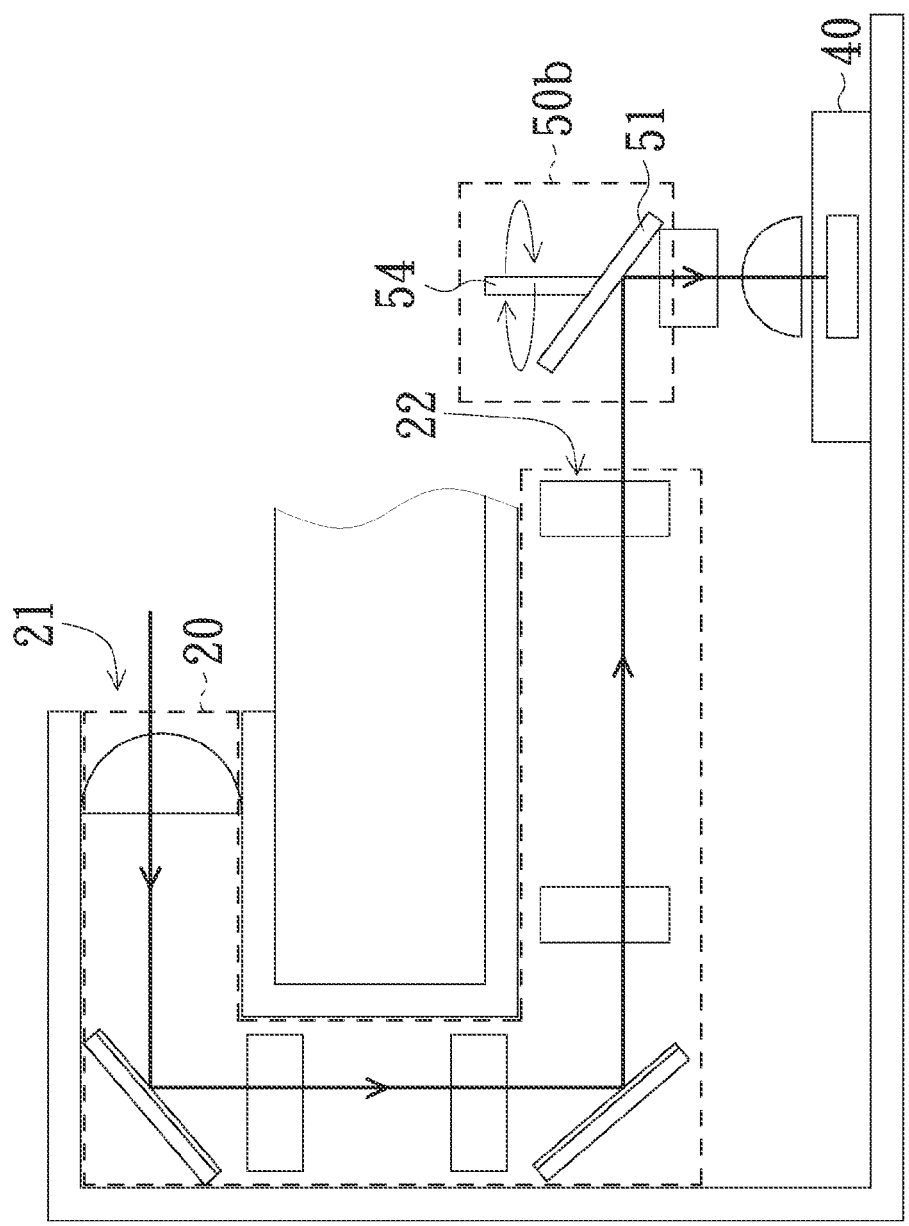
FIG. 9 is a schematic cross-sectional view exemplifying the optical touch sensitive apparatus of FIG. 8.

FIG. 8 and FIG. 9 schematically illustrate an optical touch sensitive apparatus 300 according to a further embodiment of the invention. The optical touch sensitive apparatus 300 of this embodiment is similar to the optical touch sensitive apparatus 100 in FIG. 1 except that the optical path switching unit 50b includes a reflective mirror 51 and a rotating mechanism 54 connected to the reflective mirror 51. The number of the image capturing lens modules 20 is four in this example, and the light input ends 21 of the image capturing lens modules 20 are respectively disposed at four corners of the substrate 10. The reflective mirror 51 is rotated by the rotating mechanism 54 for reflecting the optical information output from the four light output ends 22 to the light detecting unit 40 in turn. In this embodiment, since a single optical path switching unit 50b is used to sequentially transmit the optical information of the four image capturing lens modules 20 to the light detecting unit 40, the number of the light detecting units 40 is reduced relative to the number of the image capturing lens modules 20, and thus the cost of the light detecting unit 40 can be saved.

Figure 10:
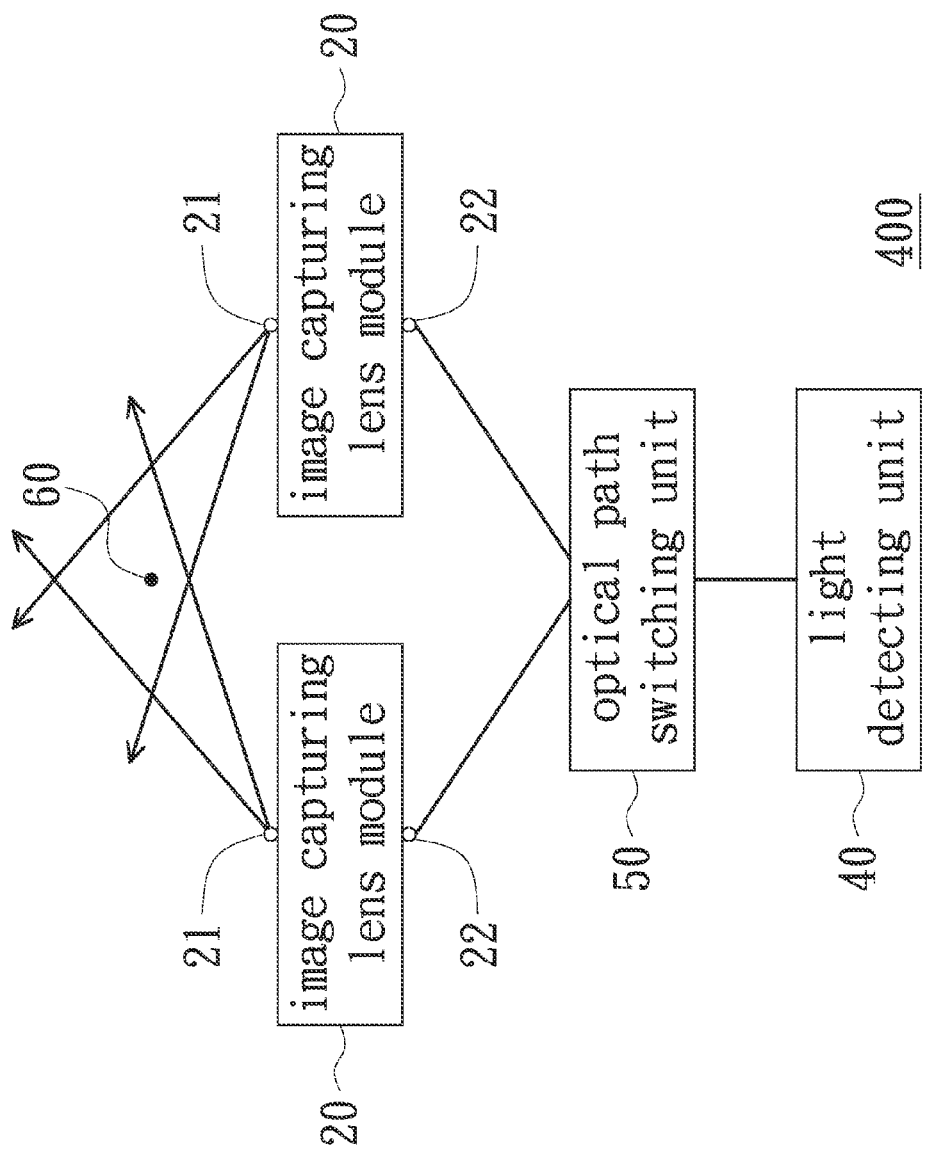
FIG. 10 is a scheme showing the construction of an image capturing apparatus according to an embodiment of the invention.

FIG. 10 illustrates an image capturing apparatus 400 adapted to be used in any of the above mentioned optical touch sensitive apparatus 100, 200, 300.

As shown in FIG. 10, the image capturing apparatus includes a plurality of image capturing lens modules 20. Each of the image capturing lens modules 20 has a light input end 21 and a light output end 22. Each of the light input ends 22 is used for receiving the optical information of an object 60 in an objective space. Any two light input ends 21 of the image capturing lens modules 20 have different fields of view, which are not completely overlapped with each other. The light output ends 22 are configured for correspondingly outputting the optical information. The light detecting unit 40 is used for receiving optical information and converting the optical information into electronic signals. The optical path switching unit 50 is disposed between the two light output ends 22 and the light detecting unit 40 for alternately transmitting the optical information output from the two light output ends 22 to the light detecting unit 40, and corresponding images are generated by the light detecting unit 40. The elements having the same numerals in the above mentioned embodiments have the same features and functions, and are not to be repeated herein.

Figure 11:
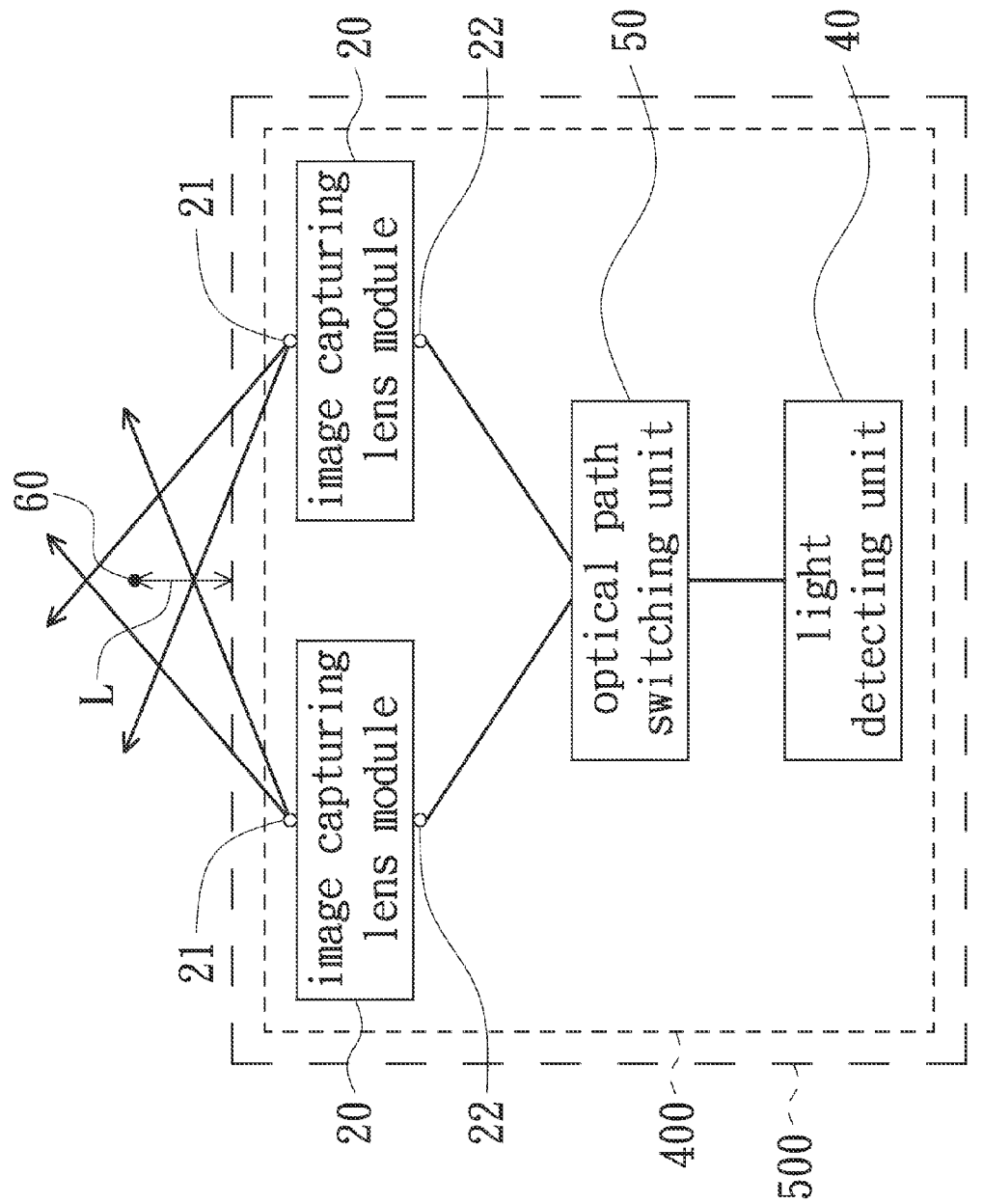
FIG. 11 is a scheme showing the image capturing apparatus used in range finding system according to an embodiment of the invention.

The image capturing apparatus 400 of this embodiment not only can be used in the optical touch sensitive module, as FIG. 11 shows, but can be used in a range finding system 500 as well. The image capturing apparatus 400 has two image capturing lens modules 20 disposed at different locations and configured for receiving optical information provided by an object 60. The light detecting unit 40 is configured for capturing the optical information received by the two image capturing lens modules 20 and generates corresponding images, and thereby a value L representing the distance of the object 60 is calculated by the range finding system 500 according to the images.

Compared to the conventional optical touch sensitive module that includes a plurality of light detecting units, the optical touch sensitive apparatus and the image capturing apparatus of the invention may include a reduced number of light detecting units relative to that of the image capturing lens modules, for example only one light detecting unit is included, for obtaining all the required optical information and is thus cost-efficient.

Furthermore, with the optical path switching unit, the optical information received by the image capturing lens modules can be transmitted to the light detecting unit in turn. In a specific embodiment, a swing mechanism and/or a rotating mechanism can be used for switching the light detecting unit among different states, and the configurations of the swing mechanism and the rotating mechanism can be varied according to practical requirement.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch sensitive apparatus, comprising:
a substrate, having an operation surface;
a plurality of image capturing lens modules, each having a light input end and a light output end, the light input end being disposed on an edge of the substrate and located above the substrate for obtaining optical information in an objective space above the operation surface, and the light output end being configured for outputting the optical information, wherein the light input ends of the plurality of image capturing lens modules are disposed at four sides of the substrate;
a light detecting unit disposed under the substrate; and
an optical path switching unit disposed between the light output ends and the light detecting unit for transmitting the optical information alternately output from the light output ends to the light detecting unit;
wherein the substrate further comprises a back surface opposite to the operation surface, and the light detecting unit and the optical path switching unit are disposed at the back surface.

2. The optical touch sensitive apparatus as recited in claim 1, wherein the substrate is a display panel.

3. The optical touch sensitive apparatus as recited in claim 1, wherein the optical touch sensitive apparatus includes two image capturing lens modules and both the light input ends of the image capturing lens modules are respectively disposed at two corners of the substrate.

4. The optical touch sensitive apparatus as recited in claim 1, wherein the optical touch sensitive apparatus includes at least two image capturing lens modules and all the light input ends of the image capturing lens modules are respectively disposed at different corners of the substrate.

5. The optical touch sensitive apparatus as recited in claim 1, wherein the optical path switching unit comprises a reflective mirror and a swing mechanism connected to the reflective mirror, and the swing mechanism swings the reflective mirror for reflecting the optical information output from at least one of the light output ends to the light detecting unit.

6. The optical touch sensitive apparatus as recited in claim 1, wherein the optical path switching unit comprises a reflective mirror and a rotating mechanism connected to the reflective mirror, and the reflective mirror is rotated by the rotating mechanism for reflecting the optical information output from at least one of the light output ends to the light detecting unit.

7. The optical touch sensitive apparatus as recited in claim 1, wherein the optical path switching unit comprises a plurality of micro mirror devices respectively disposed at positions corresponding to the light output ends for reflecting the optical information output from at least one of the light output ends to the light detecting unit.

8. The optical touch sensitive apparatus as recited in claim 1, wherein the image capturing lens module comprises a plurality of lenses and at least one reflective mirror.

9. The optical touch sensitive apparatus as recited in claim 1, wherein the optical touch sensitive apparatus further comprises a light source unit disposed at an edge of the operation surface for providing light for the light input ends to realize the optical information.

10. The optical touch sensitive apparatus as recited in claim 9, wherein the light source unit comprises a plurality of light guiding elements and a plurality of light emitting elements for providing light to the light guiding elements such that the optical information is transmitted from the light guiding elements to the objective space above the operation surface.

11. The optical touch sensitive apparatus as recited in claim 9, wherein the light source unit comprises a plurality of reflective elements and a plurality of light emitting elements for providing light to the reflective elements such that the optical information is reflected from the reflective elements to the objective space above the operation surface.

12. The optical touch sensitive apparatus as recited in claim 1, wherein the light input ends are disposed at four corners of the substrate.

13. An optical touch sensitive apparatus, comprising:
a substrate, having an operation surface;
a plurality of image capturing lens modules, each having a light input end and a light output end, the light input end being disposed on an edge of the substrate and located above the substrate for obtaining optical information in an objective space above the operation surface, and the light output end being configured for outputting the optical information, wherein the light input ends of the plurality of image capturing lens modules are disposed at four sides of the substrate;
a light detecting unit disposed under the substrate; and
an optical path switching unit disposed between the light output ends and the light detecting unit for transmitting the optical information alternately output from the light output ends to the light detecting unit,
wherein the optical path switching unit comprises a reflective mirror and a swing mechanism connected to the reflective mirror, and configured to selectively swing the reflective mirror between a first position and a second position so that when the reflective mirror is in the first position, the optical information output from one of the light output ends is directly transmitted to the light detecting unit without being reflected by the reflective mirror, and when the reflective mirror is in the second position, the optical information output from another one of the light output ends is reflected to the light detecting unit by the reflective mirror.

14. The optical touch sensitive apparatus as recited in claim 13, wherein the optical path switching unit transmits the optical information output from the light output ends to the light detecting unit in turn.

15. The optical touch sensitive apparatus as recited in claim 13, wherein the optical touch sensitive apparatus includes two image capturing lens modules and both the light input ends of the image capturing lens modules are respectively disposed at two corners of the substrate.

16. The optical touch sensitive apparatus as recited in claim 13, wherein the optical touch sensitive apparatus includes at least two image capturing lens modules and all the light input ends of the image capturing lens modules are respectively disposed at different corners of the substrate.

17. The optical touch sensitive apparatus as recited in claim 13, wherein the optical path switching unit comprises a plurality of micro mirror devices respectively disposed at positions corresponding to the light output ends for reflecting the optical information output from at least one of the light output ends to the light detecting unit.

18. The optical touch sensitive apparatus as recited in claim 13, wherein the image capturing lens module comprises a plurality of lenses and at least one reflective mirror.

19. The optical touch sensitive apparatus as recited in claim 13, wherein the optical touch sensitive apparatus further comprises a light source unit disposed at an edge of the operation surface for providing light for the light input ends to realize the optical information.

20. The optical touch sensitive apparatus as recited in claim 13, wherein the light input ends are disposed at four corners of the substrate.

\* \* \* \* \*